3,445,513
TRI(PHENYL OR ALKYL) PHOSPHAZOSULFURYL FLUORIDES AND THEIR PREPARATION

Santad Kongpricha, Hamden, Conn., assignor to Olin Mathieson Chemical Corporation, New Haven, Conn., a corporation of Virginia
No Drawing. Filed June 19, 1964, Ser. No. 376,551
Int. Cl. C07f 9/46, 9/28
U.S. Cl. 260—543          7 Claims

---

ABSTRACT OF THE DISCLOSURE

Phosphazosulfuryl fluorides having the formula $$R_3P=N-SO_2F$$

where R is alkyl, aryl, chlorine or fluorine are prepared by reacting amidosulfuryl fluoride with a phosphorus V chloride having the formula $R_3PCl_2$ at a temperature of about 60° C. to about 200° C.

---

This invention relates to the preparation of phosphazosulfuryl fluorides, and more specifically it is concerned with compounds having the formula:

$$R_3P=N-SO_2F$$
$$I$$

in which R represents an alkyl group, an aryl group (e.g., phenyl, tolyl, trimethylphenyl and the like), a chlorine or fluorine atom.

A necessary intermediate for the preparation of the fluorides (I) in accordance with this invention is amidosulfuryl fluoride ($NH_2SO_2F$) which is available by the ammonolysis of pyrosulfuryl difluoride as disclosed, for example, by Appel et al. in Angew. Chem., 70, 742 (1958).

It has now been found that amidosulfuryl fluoride reacts with various phosphorus (V) chlorides in accordance with the following equation (R being as previously defined) to provide the phosphazosulfuryl fluorides of this invention:

$$NH_2SO_2F + R_3PCl_2 \rightarrow R_3P=N-SO_2F + 2HCl$$

The fluorides (I) are stable under normal conditions, but the derivatives wherein R represents an aryl or alkyl group are particularly resistant to hydrolysis and to thermal decomposition and consequently these latter compounds are preferred embodiments of this invention.

A number of phosphorus (V) chlorides can be utilized in the preparation of the phosphazosulfuryl fluorides disclosed herein. For example, compounds of the type $R_3PCl_2$ wherein R is aryl or alkyl are obtained by direct chlorination of the corresponding phosphine derivatives as, for example, shown by Jensen in Z. anorg. allgem. Chem., 250, 257 (1943) and by Seidel et al. in Z. anorg. allgem. Chem., 288, 201 (1956) and are useful in the preparation of fluorides included in the general Formula I. However, although R may thus represent an aryl moiety, preferred embodiments of this invention include those phosphazosulfuryl fluorides wherein R represents phenyl or phenyl having lower alkyl substituents. These preferred species are prepared by reacting amidosulfuryl fluoride with triphenylphosphorus dichloride, tris(4-methylphenyl) phosphorus dichloride, tris(2,4,5-trimethylphenyl)phosphorus dichloride and the like. Similarly, preferred embodiments include phosphazosulfuryl fluorides (I) wherein R represents an alkyl group having 4–6 carbon atoms.

As mentioned in the preceding discussion, phosphazosulfuryl fluorides (I) wherein R is a chlorine or fluorine atom are provided by this invention specifically by the reaction of amidosulfuryl fluoride with phosphorus chlorides such as phosphorus pentachloride and dichlorotrifluorophosphorane. However, these products have much lower melting points than the alkyl and aryl substituted derivatives, and are more susceptible to hydrolytic decomposition. For example, $Cl_3P=N-SO_2F$ (M.P. 44°–46° C.) readily hydrolyzes to provide hydrochloric acid, phosphoric acid, fluorosulfuric acid and ammonium ion.

The preparation of the phosphazosulfuryl fluorides disclosed herein should be carried out at a reaction temperature of at least about 60° C. since an appreciably slower reaction rate is obtained at temperatures below this level. Generally speaking, it is preferred to operate at temperatures not above about 200° C. A preferred reaction temperature range of 120°–150° C. may be advantageously utilized.

The reactions can be carried out by heating the reactants at the aforementioned temperature range wherein hydrogen chloride is evolved. For example, the phosphorus (V) chlorides can be merely mixed with amidosulfuryl fluoride and heated to provide the desired phosphazosulfuryl fluorides, and no diluents or solvents are necessarily required.

However, it is preferred to utilize an inert diluent in the preparations disclosed herein. As used in the specification and claims herein, the term "inert diluent" is understood to represent an organic material which is not subject to chlorination at the aforementioned reaction temperatures. Furthermore, the inert diluent may or may not be a solvent for the reactants or products. A number of such diluents may be conveniently employed in the preparations. Particularly useful diluents are the halogenated aliphatic hydrocarbons having up to five carbon atoms and a boiling point of at least 60° C. at atmospheric pressure. For example, chloroform, carbon tetrachloride, sym-tetrachloroethane, 1,1,2,2-tetrachloro-1,2-difluoroethane and the like are advantageously used. Solvents such as benzene and the like may also be employed in the practice of this invention.

The following examples will serve to illustrate the preparation of phosphazosulfuryl fluorides in accordance with this invention. Example 1 illustrates the preparation of the trichloro derivative, while Example 2 is directed to the triphenyl derivative which is one of the preferred species of this invention.

EXAMPLE 1

Into a 500 ml. round-bottomed flask containing 300 ml. of carbon tetrachloride were placed 40.0 g. (0.192 mole) of phosphorus pentachloride and 18.5 g. (0.187 mole) of amidosulfuryl fluoride. An Allehn condenser with a drying tube on top was connected to the reaction flask, and the suspension was brought to boiling under reflux condition. Hydrogen chloride was evolved through the drying tube during the course of the reaction, and when hydrogen chloride evolution subsided, the reaction period was terminated. Then 200 ml. of carbon tetrachloride was removed by distillation from the reaction vessel. The residual solution was chilled in an ice bath. A solid material crystallized from the solution, and it was isolated by filtration. The solid was dried with absorbent paper and a white solid melting at 44°–46° C. was obtained. This solid was soluble in carbon tetrachloride, ether, benzene, toluene and acetonitrile, and it was insoluble in ligroin. The following analytical data revealed that P-trichlorophosphazosulfuryl fluoride had been obtained. Yield: 85%.

*Analysis.*—Calcd. for $Cl_3PNSO_2F$: Cl, 45.5; P, 13.2; N, 5.96; F, 8.1. Found: Cl, 45.4; P, 13.22; N, 5.82; F, 7.9.

The structure of the compound was further elucidated by infrared absorption spectrometry.

EXAMPLE 2

14.4 g. (0.044 mole) of triphenylphosphorus dichloride and 5.1 g. (0.05 mole) of amidosulfuryl fluoride were suspended in 70 ml. of carbon tetrachloride in a 100 ml. round-bottomed flask fitted with a reflux condenser and a drying tube. The suspension was heated to boiling under reflux condition until no further evolution of hydrogen chloride occurred. The carbon tetrachloride was then removed from the reaction solution by distillation, and a residual white solid product was obtained. This material was recrystallized from benzene to provide a white solid melting at 220°–222° C. The following analytical data revealed that P-triphenylphosphazosulfuryl fluoride had been obtained. Yield: 80%.

*Analysis.*—Calcd. for $C_{18}H_{15}PNSO_2F$: C, 60.2; H, 4.18; P, 8.6; N, 3.9; S, 8.9; F, 5.29. Found: C, 60.32; H, 4.48; P, 8.66; N, 3.92; S, 9.2; F, 5.64.

The structure of the fluoride was confirmed by infrared spectrometry.

The phosphazosulfuryl fluorides of this invention are useful flame retarding agents particularly when utilized in polyurethane foams and resins. The fluorides are fairly soluble in a variety of the polyethers which are conventionally reacted with isocyanates to provide urethane polymers, and it has been found that resinous products containing these agents exhibit improved resistance to flame. The trichloro and trifluoro derivatives are somewhat more effective than the trialkyl or triaryl derivatives in this area.

The S—F bond in the compounds (I) is relatively strong, and the stable derivatives have been found to be useful as corrosion inhibitors in functional fluids. For instance, they are useful as corrosion inhibitors in hydraulic fluids and synthetic lubricants adapted to be employed in materials of construction such as aluminum, iron, copper and the like. The trialkyl and triaryl derivatives are preferred for use in this application, since the stability of these derivatives is somewhat better than the trichloro or trifluoro compounds.

What is claimed is:

1. A process for preparing phosphazosulfuryl fluorides which comprises reacting
    (a) a compound having the formula $R_3PCl_2$ wherein R is selected from the class consisting of alkyl, aryl, chlorine and fluorine, with
    (b) amidosulfuryl fluoride, at a temperature range of about 60° C. to about 200° C.

2. The process of claim 1 wherein a temperature range of 120°–150° C. is utilized.

3. A process for preparing phosphazosulfuryl fluorides which comprises reacting
    (a) a compound having the formula $R_3PCl_2$ wherein R is selected from the class consisting of alkyl, aryl, chlorine and fluorine, with
    (b) amidosulfuryl fluoride, at a temperature range of about 60° C. to about 200° C. in the presence of an inert diluent.

4. The process of claim 3 wherein a halogenated aliphatic hydrocarbon having up to five carbon atoms and a boiling point of at least 60° C. at atmospheric pressure is utilized as the inert diluent.

5. Phosphazosulfuryl fluorides having the formula $$R_3P=N-SO_2F$$

wherein R is selected from the class consisting of phenyl, phenyl having lower alkyl substituents and alkyl having from 4–6 carbon atoms.

6. Phosphazosulfuryl fluorides having the formula $$R_3P=N-SO_2F$$

R being an alkyl group having 4–6 carbon atoms.

7. P-triphenylphosphazosulfuryl fluoride.

References Cited

Shevchenko, V. I., et al., J. General Chemistry U.S.R.R. (English translation) vol. 30(5) pp. 1573–6, May 1960.

LORRAINE A. WEINBERGER, *Primary Examiner.*

H. C. WEGNER, *Assistant Examiner.*

U.S. Cl. X.R.

260—77.5